United States Patent
Batchko et al.

(10) Patent No.: US 6,542,285 B1
(45) Date of Patent: Apr. 1, 2003

(54) BACKSWITCH POLING METHOD FOR DOMAIN PATTERNING OF FERROELECTRIC MATERIALS

(75) Inventors: Robert G. Batchko, Stanford, CA (US); Gregory D. Miller, Foster City, CA (US); Robert L. Byer, Stanford, CA (US); Vladimir Shur, Ekaterinburg (RU); Martin M. Fejer, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/493,647

(22) Filed: Jan. 28, 2000

Related U.S. Application Data

(63) Continuation-in-part of application No. 09/464,464, filed on Dec. 14, 1999.
(60) Provisional application No. 60/112,385, filed on Dec. 14, 1998.

(51) Int. Cl.$^7$ .............................................. G02F 1/355
(52) U.S. Cl. ........................ 359/326; 359/332; 385/122
(58) Field of Search ................................ 359/326–332; 372/21–22; 385/122

(56) References Cited

U.S. PATENT DOCUMENTS

| | | | | |
|---|---|---|---|---|
| 5,171,400 A | * | 12/1992 | Magel et al. | 117/19 |
| 5,734,772 A | * | 3/1998 | Gopalan et al. | 385/122 |
| 5,748,361 A | * | 5/1998 | Gupta et al. | 359/332 |
| 6,198,568 B1 | * | 3/2001 | Galvanauskas et al | 359/332 |
| 6,229,828 B1 | * | 5/2001 | Sanders et al. | 372/22 |

\* cited by examiner

Primary Examiner—John D. Lee
(74) Attorney, Agent, or Firm—Lumen Intellectual Property Services, Inc.

(57) ABSTRACT

A method for fabricating periodically poled structures. The method produces an electric field within a ferroelectric substrate by applying a voltage waveform to an electrode structure disposed on a surface of the substrate. The waveform raises the electric field magnitude to a level substantially greater than that required to reverse domains within the substrate. Domain reversal continues through to completion at which time the poling field is turned off or substantially reduced to induce spontaneous backswitch poling. The forward poling field is then reapplied to stop the backswitch poling. The ability to selectively enable and terminate backswitching allows for the formation of domain patterns with small feature sizes and high uniformity through large volumes of material.

15 Claims, 12 Drawing Sheets

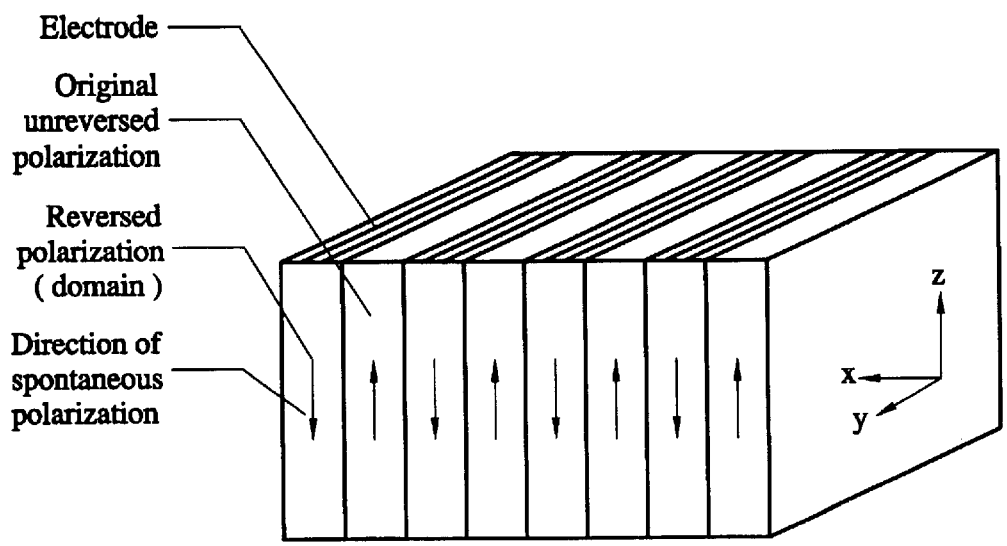
Fig. 1
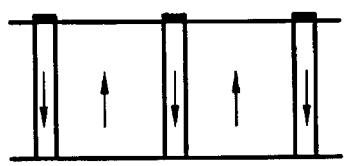
Fig. 2(a)
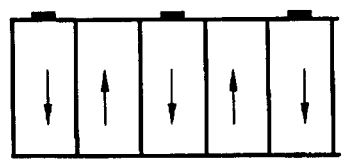
Fig. 2(b)
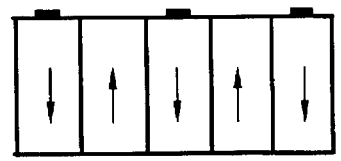
Fig. 2(c)
Fig. 2(d)   Fig. 2(e)   Fig. 2(f)

BACKSWITCH POLING METHOD FOR DOMAIN PATTERNING OF FERROELECTRIC MATERIALS

CROSS-REFERENCE TO RELATED APPLICATIONS

This application is a continuation-in-part of U.S. patent application Ser. No. 09/464,464, filed Dec. 14, 1999, which is based on and claims priority from Provisional application 60/112,385 filed Dec. 14, 1998, both of which are herein incorporated by reference.

STATEMENT REGARDING FEDERALLY SPONSORED RESEARCH OR DEVELOPMENT

This invention was supported in part by grant number ONRN0001492J1903 from the Office of Naval Research (ONR). The Government has certain rights in the invention.

FIELD OF THE INVENTION

This invention relates generally to light sources. More particularly, it relates to electric light sources.

BACKGROUND ART

Highly efficient and economical multi-watt red, green, and blue lasers are desirable for display applications. Unfortunately, existing semiconductor lasers are generally not available at power levels and wavelengths suitable for display applications. Displays for consumer applications require reliable multi-watt sources that can be manufactured in high volumes. Although many factors influence manufacturing costs, some of the most significant are the number of parts and alignment steps, tight tolerances, and the cost of components.

The wavelengths of currently available lasers can be converted to those required for displays using nonlinear optics. Nonlinear optics has been used to produce wavelengths throughout the visible spectrum, over a wide range of powers, with optical-to-optical efficiencies well in excess of 50%. However, the relatively low nonlinear coefficient of available materials requires resonant or mode-locked frequency conversion schemes that are incompatible with the economics of displays. Alternatively, nonlinear waveguides may be used, but these have limited power-handling capability. To meet the needs of display applications, a new class of nonlinear optical materials employing quasi-phase-matching is required.

To reduce the number of parts and alignment steps, a bulk single-pass configuration for second harmonic generation (SHG) using one infrared semiconductor laser and one nonlinear crystal, is preferred over a resonant design. Generally, the semiconductor laser and nonlinear crystal are the costliest components in this source. Semiconductor laser bar prices have declined at approximately 30%/year since 1985. Single-emitter multi-watt semiconductor lasers are expected to follow a price-volume relationship similar to that of laser bars. The cost of the nonlinear crystal is also strongly tied to volume and the stability of the fabrication technology. Consequently, it is more reasonable to modify existing nonlinear optical materials than to develop new materials. Lithium niobate ($LiNbO_3$), often referred to as "the silicon of nonlinear optics," is an excellent material for SHG for two reasons. First, $LiNbO_3$ is already produced at a volume of 40 tons per year for consumer applications (cellular phones and televisions) using a very stable fabrication technology. Second, $LiNbO_3$ is transparent from 350 nm to 5000 nm, providing low loss for both the fundamental and harmonic for visible light generation. Finally, $LiNbO_3$ has nonlinear coefficients for visible light generation among the highest of all inorganic materials.

While $LiNbO_3$ is an attractive material because of its status as a commodity material, the only component of its nonlinear tensor large enough to satisfy the requirements of display applications is $d_{33}$, having a value of 25.2 pm/volt. While dispersion prevents direct access to the full $d_{33}$ coefficient, quasi-phase-matching (QPM) can provide up to 64% of the full nonlinearity, or 16 pm/volt, making $LiNbO_3$ a very strong candidate for display applications that use QPM.

Essentially QPM is a technique that compensates for the difference in phase velocity between the fundamental wave and its harmonic in a nonlinear crystal caused by natural dispersion. In QPM, two waves having different phase velocities shift $\pi$ out of phase relative to one another over a distance called the coherence length. The sign of the nonlinear coefficient reverses every coherence length, causing the locally generated harmonic field to transfer power to the harmonic beam. By compensating for phase-velocity mismatch in this way, all elements of a crystal's nonlinear tensor can be accessed throughout the entire transparency range.

Two other potential materials in which QPM has been demonstrated for visible light generation are $LiTaO_3$ and $KTiOPO_4$ (KTP). $LiTaO_3$ has a normalized room temperature conversion efficiency of 0.83%/(watt-cm), below that required for bulk single-pass 1064 nm SHG. However, for 852 nm SHG, $LiTaO_3$ has a normalized conversion efficiency of 1.8%/(watt-cm) and would be suitable for that application. KTP has a normalized conversion efficiency for 1064 nm SHG of 1.7%/(watt-cm). To achieve 25% single-pass conversion efficiency of a one watt fundamental, a crystal of 3.6-cm length is required; however, the maximum crystal length in production is 3 cm. For 852 nm SHG, KTP's normalized conversion efficiency is 4.1%/(watt-cm), and would be a strong candidate for that application.

Various approaches have been studied to create QPM structures, including use of rotationally twinned crystals, stacking of alternately oriented thin plates, and growth of periodic domain structures in ferroelectrics. For waveguides where QPM is required only at the surface of the crystal, periodic annihilation of the nonlinear coefficient and periodic domain inversion by dopant indiffusion in ferroelectrics have been employed. Periodic domain structures can be formed in ferroelectrics by applying an electric field using lithographically defined periodic electrodes. Yamada, et al. and Fejer were the first to report a demonstration of this approach. This last technique is referred to as electric field periodic poling, and is now often referred to simply as periodic poling. ("Poling" refers to the process whereby the spontaneous polarization of a ferroelectric crystal can be reversed under the influence of a sufficiently large electric field. In this application, the term "electric field periodic poling" will be used to differentiate from other periodic poling techniques.)

In both electric field periodic poling and waveguides, lithographic techniques are used to assure the periodicity of the QPM structure. The fabrication of masks for lithography typically employs interferometric feedback control. This type of control can limit the positional error of any feature over the dimension of the mask to less than a quarter-wavelength of radiation, e.g. 0.16 $\mu$m for He-Ne. For a 5-cm-long 5-$\mu$m-period grating, this amounts to a maximum period fluctuation of 6 parts in 1 million, resulting in a negligible reduction in conversion efficiency. The ability to define QPM structures with lithographic precision created an opportunity in nonlinear optics to fabricate devices with interaction lengths not possible using non-lithographic techniques.

Previous periodic poling techniques have produced 50-mm-long, 0.5-mm-thick periodically poled LiNbO$_3$ (PPLN) with a 29.75-μm period. For visible light generation using PPLN, many applications would benefit from electric field periodic poling technology capable of producing domain periods below 15 μm in devices at least 1.0 cm long. Domain periods between 6 μm and 7 μm are required for green light generation, and blue light generation requires domain periods between 4 μm and 5 μm. The longest prior PPLN devices for visible light had a period of 4.6 μm, were 6 mm long, and a thickness of 200 μm. Domain pattern quality had decreased as the period was reduced.

Therefore, a need exists in the art for an electric field poling process that accounts for the dependence of domain quality on period and thickness to produce shorter domain periods.

OBJECTS AND ADVANTAGES

Accordingly, it is a primary object of the present invention to provide a model of the electric field periodic poling process in LiNbO$_3$ that predicts poling outcomes and is useful as a design tool. It is a further object to provide an optimized poling waveform. It is an additional object to provide a means for fabricating non-linear crystals that are quasi-phase-matched over their entire length.

SUMMARY

These objects and advantages are attained by a novel method for fabricating a periodically poled structure from a ferroelectric substrate having an electrode structure and an insulator structure. The method produces an electric field within the substrate by applying a voltage waveform to the electrode structure. During a forward poling stage, the waveform raises the electric field magnitude to a level substantially greater than that required to reverse domains within the substrate. The forward poling stage poling is allowed to continue through to completion, i.e., when the domains spread beneath the insulator and generally merge in bulk. Once forward poling has been completed the external field is removed before the depolarization field has been screened by bulk and external charges. The depolarization field switches sign due to the process of forward domain inversion. The depolarization field is, therefore, momentarily large enough to cause the erasure, or backswitching, of the forward switched domains. Depending on the speed of the screening process, backswitching can continue until the domains have returned to their original state. In embodiments of the present method, however, backswitching can be terminated by re-applying the external field. The ability to selectively enable and terminate backswitching allows for the formation of domain patterns with small feature sizes and high uniformity through large volumes of material.

BRIEF DESCRIPTION OF THE FIGURES

FIG. 1 is a diagram of typical domain configuration of electric fields in a periodically poled non-linear crystal;

FIGS. 2(a)–2(f) depict stages of domain kinetics during electric field periodic poling of a non-linear crystal;

DETAILED DESCRIPTION

Figure 3:
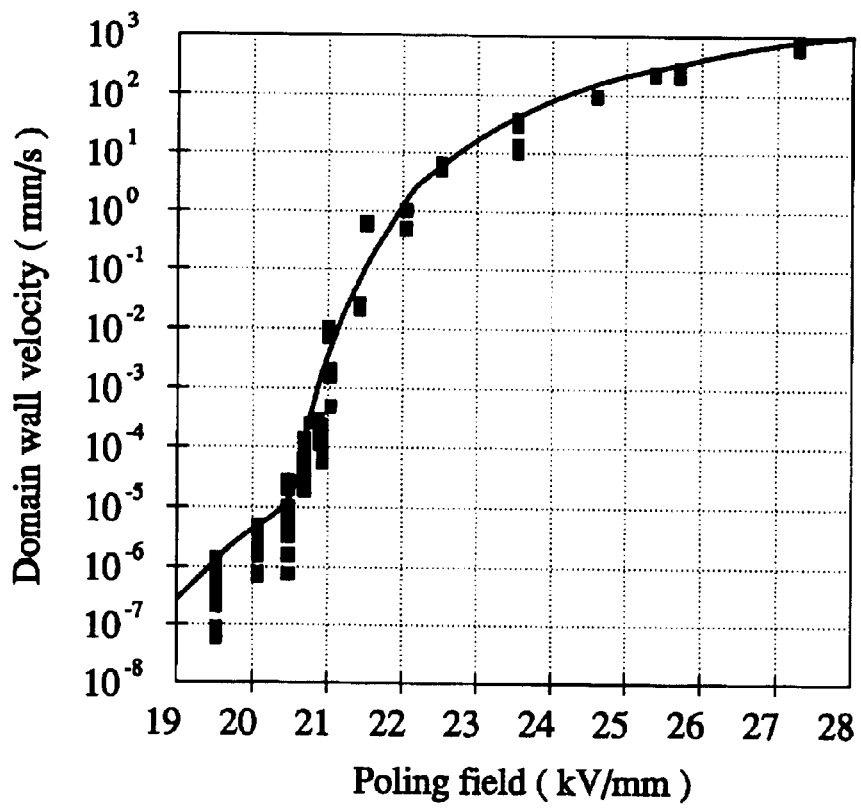
FIG. 3 Depicts a graph of domain wall velocity versus poling field.

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

THEORETICAL

The conversion efficiency of the nonlinear crystal has an impact on the total system cost by affecting the power requirements of the semiconductor laser source. A reasonable goal for single-pass conversion efficiency is that it should exceed 25% to avoid excessive laser cost. In the low conversion limit, conversion efficiency η for confocal focusing is given by $$\eta \equiv \frac{P_{2\omega}}{P_{2\omega}} = 16\pi^2 \frac{d_{\it{eff}}^2 Z_0}{n_\omega n_{2\omega} \lambda^3} LP_\omega \text{sinc}^2[\Delta kL/2], \quad \text{Eq. 1}$$

where $P_{2\omega}$ is the power in the second harmonic, $P_\omega$ is the power in the fundamental, $d_{\it{eff}}$ is the effective nonlinear coefficient in m/volt, $Z_o$ is the impedance of free space, $\Delta k \equiv k_{2\omega} - 2k_\omega$, $k_{2\omega} \equiv 2\pi n_{2\omega}/(\lambda/2)$, $n_{2\omega}$ is the index of refraction at the harmonic, $k_\omega \equiv 2\pi n_\omega/\lambda$, $n_\omega$ is the index of refraction at the fundamental, $\lambda$ is the fundamental wavelength, L is the length of the nonlinear crystal, and $$\text{sinc}(x) \equiv \frac{\sin(x)}{x}.$$

Note that conversion efficiency is proportional to crystal length, input power, and the square of the effective nonlinear coefficient. As crystal length is increased, conversion efficiency increases, but the nonlinear conversion process becomes more sensitive to changes in wavelength, temperature, strain, and other factors affecting the difference in refractive indices. In addition to overall variation in the refractive index difference, local variations impose an additional constraint on the maximum useful crystal length. As a result, length alone cannot be used to compensate for either low nonlinearity or low input power.

To estimate the nonlinearity required to produce one watt of 532 nm green light from a four-watt 1064 nm source, consider an example where the nonlinear material has refractive indices of approximately 2 at both the fundamental and harmonic, and the maximum device length is limited to 50 mm. Solving Eq. 1 for $d_{eff}$=10 pm/volt, obtains a normalized conversion efficiency of about 1.25%/(watt-cm).

Sources based on bulk single-pass second harmonic generation therefore require crystals with a nonlinear coefficient greater than 10 pm/volt, useful lengths up to 50 mm, and good transparency throughout the visible range. While crystals exist that satisfy two out of three of these requirements, no prior crystals were capable of satisfying all three simultaneously.

PERIODIC POLING METHOD

FIG. 1 depicts a diagram of domain configuration of electric fields in periodically poled non-linear material such as a crystal of $LiNbO_3$. A crystal 100 includes a plurality of domains 102, 103 bounded by domain walls 104. Note that domain 10 walls 104 are quite straight and parallel to a z-axis of crystal 100, from the electrode surface into the bulk of the crystal. A surface 106 of the crystal is covered with a pattern of electrodes 108 . Arrows 110, 111 indicate electric field polarization within domains 102, 103. Note that the polarization in domains 102 underneath electrodes 108 is opposite an original, i.e. unreversed, polarization in domains 103. The electric fields 110 are highly non-uniform near the electrodes 108. Similar behavior can also been seen in $LiTaO_3$. The domains 102 have a greater width than electrodes 108, indicating that spontaneous polarization charge was deposited on the surface of crystal 100 between the electrodes. In the absence of conduction this charge would be unscreened, and would give rise to fields of the sign opposite to that required for domain reversal.

The present method for producing a crystal of the type shown in FIG. 1 is based on five basic assumptions regarding the domain kinetics.

1. Domain walls are flat and normal to the crystal x-axis.
2. Domain wall motion is governed by the z-component of the electric field averaged over the x-z cross-section of the domain.
3. The functional relationship between domain wall velocity and the z-component of the electric field averaged over the x-z cross-section of the domain is the same everywhere in the crystal.
4. Nucleation occurs exclusively at the electrodes.
5. The dielectric relaxation times of the ferroelectric and insulator are assumed to be much longer than the poling time.

With these assumptions, domain kinetics during electric field periodic poling of crystal 100 according to an embodiment of the method of the present invention are described in six stages as shown in FIGS. 2(a)–2(f). Typically crystal 100 is a non-linear material such as a ferroelectric. Suitable ferroelectrics include lithium niobate ($LiNbO_3$). Crystal 100 can be prepared with periodic electrodes and lithographically defined electrode structures 108 with periods from 1.75 $\mu$m to 15 $\mu$m.

Electrodes 108 can be any metal, such as aluminum, titanium, tantalum, chrome, nickel, or nichrome. Electrodes 108 can be deposited by any conventional technique, such as evaporation or sputtering. The electrode pattern may be defined using lift-off and the electrode pattern over-coated with photoresist, oxide, spin-on-glass or oil to increase the surface resistance of crystal 100. Poling is typically performed in a dielectric oil. In other cases, samples were prepared with metal deposited over patterned photoresist, contacting the surface through the patterned openings. Crystal 100 is typically clamped between o-rings. The electrode pattern may be over-coated with an insulator, with an opening in the insulator provided to allow electrical contact with an electrolyte. In the experimental study of the stages of domain kinetics, uniformly electroded samples were prepared with uniform electrolyte contacts. The contacts were applied to the polar faces of 6.0-mm-square single-domain samples with thickness, ranging from 250 $\mu$m to 1 mm. Electrolyte solutions were chosen because metallic contacts resulted in observations highly dependent on the choice of metal and its method of application; experimental outcomes were not dependent on the choice of electrolyte. Suitable electrolytes include solutions of lithium chloride or sodium chloride in deionized water, pure deionized water, tap water, isopropanol, and methanol.

A voltage, of appropriate polarity, applied electrodes 108 produces anti-polar electric fields (electric fields whose direction is opposite to that of the spontaneous polarization) in crystal 100. Typical field magnitudes range from 19 kV/mm to 60 kV/mm. Pulse lengths typically range from 100 ns to 3 h. A Trek Model 20/20 high voltage amplifier was used for pulses 10 $\mu$s and longer, and a Hughes Crossatron 45 kV switch was used for shorter pulses. After poling pulses are applied, domains were revealed on samples using hydrofluoric acid at room temperature for 5 min. Use of this observation technique is permissible only if the domain size remains unchanged after the poling pulse terminates. The poling pulses were designed to allow the domains to stabilize without further growth.

In FIG. 2(a) a pulsed voltage is applied to electrodes 108. Initially crystal 100 has a polarization direction indicated by arrow 111. This stage is sometimes referred to as forward poling. Domain nucleation typically begins at the edges of electrodes 108. Each individual domain 102 has a single starting point, called the nucleation site. Nucleation sites are typically located on both sample faces. Nucleation sites tend to be grouped in clusters, in arcing or linear paths, or near domains already in the wall propagation stage.

Nucleation site density (NSD) is field- and time-dependent for fields below 21 kV/mm. For fields from 24 kV/mm to 64 kV/mm and pulse durations down to 100 ns, NSD is independent of field strength and pulse width.

Periodic electrodes 108 tend to cause a significant increase in NSD compared to uniform electrolyte contacts. The domains typically nucleate along the edges of electrodes 108 with a linear density of 0.1–2 nuclei/$\mu$m. The electrode/insulator configuration and the choice of electrode material strongly influence NSD. In a preferred embodiment, electrodes 108, are sputtered nichrome stripes over-coated with spin-on-glass.

As shown in FIG, 2(b), domain tips 120 propagate toward an opposite face 107 of crystal 100. Tips 120 propagate parallel to a polar axis of crystal 100, dominating the growth of the domain in this stage. As tips 120 propagate, the diameter of a base of domains 102 increases. The ratio of tip velocity to the wall velocity at the base is between about 100:1 and about 1000:1.

During tip propagation, domain tips 120 from adjacent electrodes 108 can merge, leading to the formation of a single large domain 102 instead of two separate domains. The merging of domains reduces the effective nonlinearity of PPLN and occurs mainly during the tip propagation stage. One source of domain merging is substrate inhomogeneity, which causes domain tips to wander from a strictly z-directed path.

Another important source of domain merging is tip-to-tip interactions. When two domain tips are in close proximity, the unscreened polarization charge on their walls slightly increases the electric field in the region between them. This increased field leads to an increased growth rate on the walls closest to the nearby domain. The increased growth rate causes the paths of the domain tips to merge. In electric field periodic poling, this type of merging is preferred between closely spaced tips generated by the same electrode stripe. However, under conditions of low NSD where the closest tips are those generated by separate electrode stripes, merging results in the loss of a domain and reduction of the effective non-linearity. For electrode periods >15 $\mu$m, merging happens almost exclusively under the electrodes, depending on the field used during poling. Below 10 $\mu$m, the frequency with which domains from adjacent electrodes merge increases rapidly. The depth at which domains from adjacent electrodes merge is ~100 $\mu$m.

In FIG. 2(c) tips 120 terminate at the opposite face 107 of crystal 100. When the tips of isolated domains 102 contact opposite face 107 of the crystal, walls 104 of domains 102 straighten on a time scale shorter than about 1 $\mu$s, creating a hexagonal shape with the same diameter as that of the original nucleus. During this brief stage, domains 102 greatly reduce their electrostatic interaction with neighboring domains as a result of their walls 104 becoming parallel to the z-axis. When a pair of domain tips 120 merge as they propagate through crystal 100, the termination event results in a larger domain 102 than would occur in the absence of merging, due to the large energy penalty associated with tilted domain walls 104. The close proximity of domain tips 120 generated by a single stripe electrode 108 gives rise to merging under the electrode, and the tip termination stage contributes to complete reversal of the domain under the electrode as shown in FIG. 2(d).

In FIG, 2(d) domains 102 rapidly coalesce under electrodes 108 to form a larger domain when their walls 104 touch. The velocity of the domain wall in the region where two domains made contact is generally many times larger than the domain wall velocity elsewhere. Samples with periodic electrodes 108 benefit from rapid coalescence, since it provides a means for domains 102 to fill in the space under electrodes 108 before they begin to spread outward.

When tip 120 of an isolated domain 102 terminates at opposite face 107 of crystal 100, the diameter of the domain at both faces rapidly equalizes. Domain walls 104 then propagate out from under electrodes 108, as shown in FIG. 2(e). By obtaining the relationship between domain wall velocity and electric field for samples with uniform electrodes 108, domain kinetics during the wall propagation phase of electric field periodic poling can be calculated. In addition, the relationship can identify whether there is a field at which domain wall velocity is most sensitive to changes in the field.

FIG. 3 depicts a graph of domain wall velocity versus poling field for a sample of $LiNbO_3$. The squares are experimental data and the solid curve is the fit based on an equation discussed below. For fields between 19 and 28 kV/mm, the domain wall velocity varies over 10 orders of magnitude in this interval. The scatter in data points at fields below 21 kV/mm shows that some domains nucleate before others, indicating that nucleation is a time-dependent process at low fields. Generally, the longer the field is applied, the greater the number of nucleation sites. The relative lack of scatter above 21 kV/mm shows that nucleation occurs on a time scale much shorter than the pulse duration with increasing field and that the number of nuclei-per-unit-area does not increase with increased pulse length in this regime. Samples poled at fields up to 64 kV/mm exhibit no noticeable increase in nucleation site density, and all the domains on each sample were nearly equal in size. It is interesting to note that, at fields above ~30 kV/mm, the domains take on a triangular shape. This suggests that there are only a finite number of nucleation sites available in $LiNbO_3$. Previous models indicate that nucleation rate is proportional to exp ($\Delta W/kT$), where $\Delta W$ is the energy associated with domain nucleation, k is Boltzmann's constant, and T is temperature. This measurement suggests that all available nucleation sites are activated at the beginning of the poling pulse for fields above 24 kV/mm.

In $BaTiO_3$, domain wall velocity data has been described well by a fitting function of the form:

$$\tau(E) = \tau_{28} \exp(-\delta/E). \quad \text{Eq. 2}$$

This function however cannot fit the apparent inflection in the graph of FIG. 3 at around 20.5 kV/mm. The data appear to be generated by a superposition of two functions similar to Eq. 2, differing in that each function's domain wall velocity goes to zero for some positive non-zero value of electric field. Thus, the fitting function applied to this data is $$v(E) = \Phi(E - E_1) v_1 \exp\left(-\frac{\delta_1 E_1}{E - E_1}\right) + \Phi(E - E_2) v_2 \exp\left(-\frac{\delta_2 E_2}{E - E_2}\right) \quad \text{Eq. 3}$$

where $\Phi$ is the Heaviside step function and the fitting parameters are given in Table I below

TABLE I

| Fitting parameters for velocity-field function. | |
|---|---|
| $E_1$ = 19.4 kV/mm | $E_2$ = 15.0 kV/mm |
| $v_1$ = 16.3 m/sec | $v_2$ = 362 $\mu$m/sec |
| $\delta_1$ = 1.29 | $\delta_2$ = 3.83 |

Figure 4:
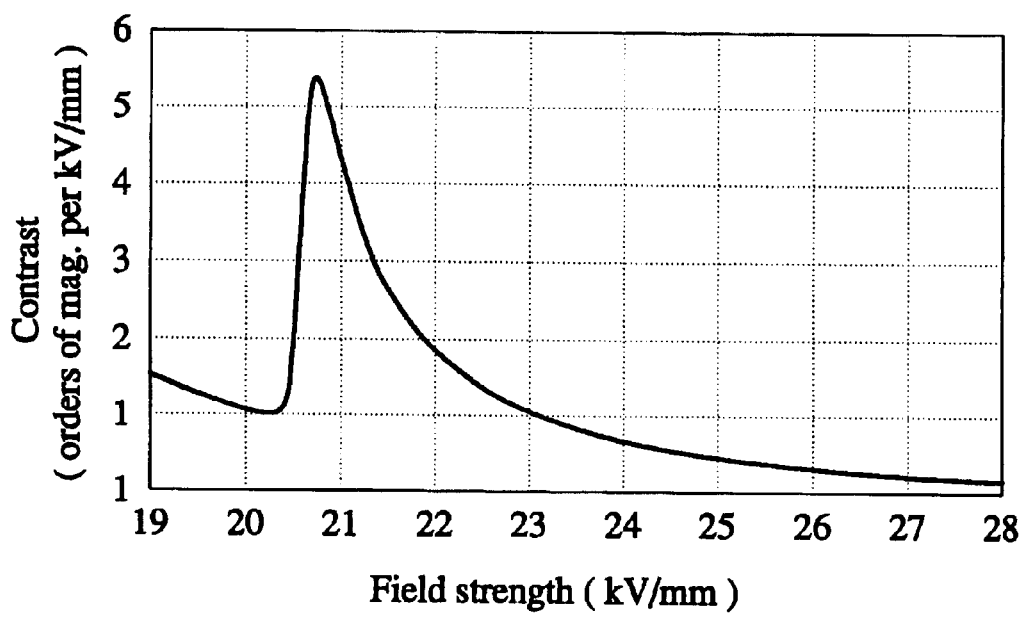
FIG. 4 shows a typical contrast curve for a velocity-field function.

Eq. 3 can be used to determine the field at which domain wall velocity is most sensitive to changes in the average field in the crystal. As domains 102 spread out from under the electrodes, the unscreened spontaneous polarization charge deposited on surface 106 of the crystal lowers the average field seen by domain 102, slowing its growth. By periodic poling with the field at which domain wall velocity is most sensitive to changes in the average field, a strong negative feedback mechanism is created, preventing the excessive spreading of domains 102 beyond electrodes 108. This optimum field can be determined from the peak of a derivative of the logarithm of Eq. 3, also referred to as a contrast curve. FIG. 4 shows an exemplary contrast curve for a $LiNbO_3$ sample. The curve in FIG. 4 shows that domain wall velocity is most sensitive to slight variations in the applied field at 20.75 kV/mm, varying 5.5 orders of magnitude per kV/mm at that field.

Eventually, new domains 102 stabilize as shown in FIG. 2(f). Newly formed domains 102 can exhibit a time-dependent coercive field. Typically, this field is initially ~−17.5 kV/mm and decays in ~60 ms to 0 kV/mm. A positive value of the coercive field indicates that the applied field opposes the direction of the spontaneous polarization, which is the usual situation in ferroelectric materials. A negative value indicates that the direction of the applied field causing domain reversal is the same as that of the spontaneous polarization. Preferably, the initial value of the coercive field is less than the negative value of the applied field. The initial value of the coercive field and the time required to reduce the field to zero are typically material-dependent parameters.

For example, in the case of newly formed domains in $LiNbO_3$, a field in the same direction as the spontaneous polarization with a magnitude of 17.5 kV/mm or more is required to maintain domain orientation. Reducing the externally applied field to 0 kV/mm in less than 60 ms will cause domains to flip back in a process called 'backswitching'. Within one day of domain reversal, the coercive field approaches ~+19 kV/mm, and remains unchanged even after several days at room temperature. Myers reported that heating for 1 h at 120° C. restores the coercive field to its original value, 21 kV/mm. He also observed that domains remain stable at temperatures at least as high as 800° C.

During the formation of periodically poled structures, it is important that poling comes to completion before the applied field begins to decrease. After poling is complete, the current delivered to the sample should stop, with the possible exception of leakage current in the poling fixture. It is possible to ascertain from the poling waveform whether leakage is a significant contributor to the current waveform by analyzing the proportionality between the voltage and current waveforms. Another source of current is displacement current associated with the changes in voltage across the sample. Finally, electrical noise and discretization errors contribute to the current waveform. Fortunately, electrical noise of sufficient amplitude coupled with a sufficiently high sampling rate can be used to digitally remove discretization errors. A digital sampling oscilloscope, such as a model 9304M, made by Lecroy, of Chestnut Ridge N.Y., may be used to capture and save the waveforms for later processing.

In electric field periodic poling, the poling waveform should be designed to ramp from the poling voltage to zero in 60 ms or longer to suppress backswitching. However, the electrostatics of periodic poling give rise to the possibility that some backswitching in the vicinity of the electrode edges may be difficult to avoid. The lack of screening on the $LiNbO_3$ surface between the electrodes results in anti-polar fields that are increased due to relaxation of the built-in field. These anti-polar fields can nucleate backswitching at the electrode edges.

In electric field periodic poling, the main objective is to obtain a specified domain period and duty cycle with acceptable uniformity throughout the volume of the crystal. While the domain period is assured by the lithography that produces the electrode patterns, many factors influence duty cycle uniformity. Good duty cycle uniformity is important because it contributes to the efficiency of QPM devices and, in the case of photorefractives like $LiNbO_3$, to resistance against photorefractive damage when a 50% domain duty cycle is employed. RMS duty cycle errors must be maintained below 37.5% to achieve at least 50% of ideal conversion efficiency. To achieve resistance to photorefractive damage comparable to $MgO:LiNbO_3$, we estimate that RMS duty cycle errors need to be kept below 1%.

To maximize duty cycle uniformity and obtain the required mean duty cycle, two strategies are employed. The first is to design an electrode and insulator geometry and poling waveform that minimizes the influence of defects. The second is to eliminate defects through advancements in fabrication technology.

Figure 5:
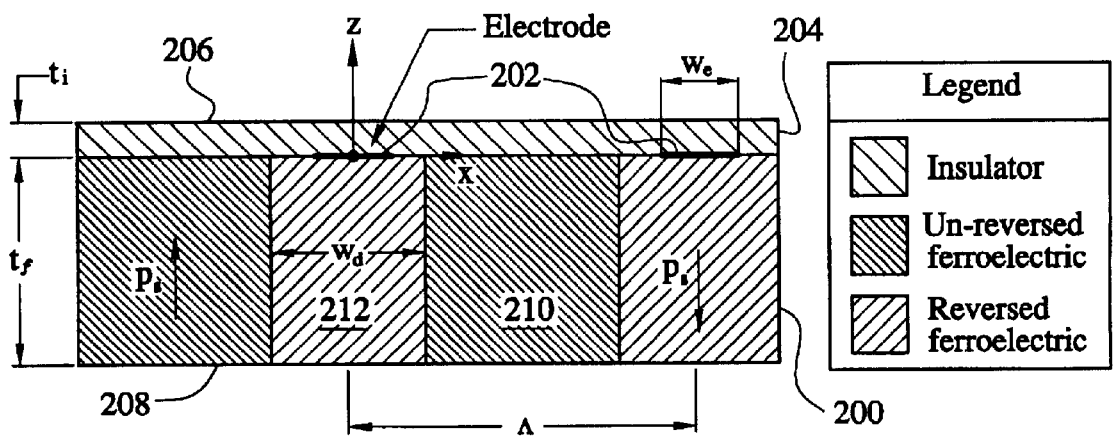
FIG. 5 depicts a cross-sectional view of a poling configuration and variables used to calculate fields and potentials according to an embodiment of the method of the present invention.

FIG. 5 depicts cross-section view for a poling configuration and variables used to calculate fields and potentials. A ferroelectric material 200 with a periodic array of thin metal electrodes 202 lithographically defined on its +z face and over-coated with a uniform thickness insulator 204. Electrodes 202 have width $w_e$. The potential of electrodes 202 is $v_e$. The z-axis is parallel to the z-axis of the original single-domain ferroelectric. An exposed surface 206 of the insulator (at $z=t_i$) is held at a uniform covering potential, $v_c$, typically using an electrolyte contact. An exposed surface 208 of the ferroelectric, the minus z-face, (at $z=-t_f$) is held at the reference potential, 0 volts, also typically using an electrolyte contact. In FIG. 5, the direction of the spontaneous polarization $P_s$ is shown for both un-reversed regions 210 and reversed regions 212 of ferroelectric material 200. Reversed regions 212 are commonly referred to as domains, although this term generally applies to regions of either sign of spontaneous polarization. The domains have width Wd. The domain duty cycle is defined as $DC_d \equiv w_d/\Lambda$ and the electrode duty cycle is defined as $DC_e \equiv w_e/\Lambda$.

A computational model permits simulation of the poling process. Through simulation, design parameters can be iterated until a design is obtained that achieves the desired domain duty cycle and has a low sensitivity to defects.

The kernel of the computational model is an equation yielding domain wall duty cycle as a function of time, referred to as the equation of domain wall motion, $$DC_d(t) = \frac{2}{\Lambda} \int_0^t v(E_0(DC_d(\tau); u)) d\tau + DC_d(0), \qquad \text{Eq. 4}$$

where $DC_d(t)$ is domain duty cycle as a function of time t, v(E) is domain wall velocity as a function of average field given in Eq. 4, $E_0(DC_d;u)$ is the average field in the ferroelectric as a function of domain duty cycle, u is a vector of geometric and dielectric parameters and the poling waveform, and $\Lambda$ is the domain period. The subscript "d" in $DC_d$ indicates domain duty cycle, as distinguished from the subscript "e" in $DC_e$, which indicates electrode duty cycle. The kernel is used to iterate on the parameters in u until the desired duty cycle is least sensitive to variations in both u and the poling pulse duration.

The design process is essentially a numerical optimization procedure. It begins with a guess for u and $DC_d=DC_e$. Next compute the average substrate field using a suitable method and then the domain wall velocity using Eq. 2. Using an appropriate choice of time step, compute the new domain duty cycle. The value of u may be updated if u is time-dependent. The procedure repeats until the desired duty cycle is obtained. The time at which the desired duty cycle is obtained is the nominal poling time associated with u, $t_{pole}$. The sensitivity S of domain duty cycle to variations in u and $t_{pole}$, can be computed using, for example:

$$S(u; t_{pole}) = \qquad \text{Eq. 5}$$
$$\sqrt{\left[\frac{\partial}{\partial t}\ln(DC_d(u; t))\bigg|_{t=t_{pole}}\right]^2 + \sum_{i=1}^{n}\left[\frac{\partial}{\partial u_i}\ln(DC_d(u; t))\bigg|_u\right]^2}.$$

Iteration of the parameters in u minimizes S. These parameters will result in a minimum-sensitivity design for the desired domain duty cycle.

In the case where u is time invariant (e.g. a constant poling voltage is used), the optimization procedure can be made faster because the computation of domain duty cycle as a function of time can be performed in a straightforward manner. The procedure is as follows: First, generate a vector of domain duty cycles with values between $DC_e$ and 50%.

Second, generate a vector of domain wall velocities for each of the domain duty cycles using Eq. 2 and a suitable solution for the electric field in ferroelectric material 200 or insulator 204 due to the potential on electrodes 202. Third, generate a vector of time values using $$t_i = t_{i-1} + \Lambda \frac{DC_{d_i} - DC_{d_{i-1}}}{v_i + v_{i-1}}, \qquad \text{Eq. 6}$$

where i=1 . . . rows (DC$_d$)−1. The sensitivity is typically calculated at the final time step. The vector u is adjusted as in the more general case.

Given u, domain wall velocity and domain duty cycle can be plotted and compared against experimental data. Note that domain wall velocity is proportional to poling current, and domain duty cycle is proportional to the charge delivered. The model's predictions generally agree with experimental data.

Figure 6:
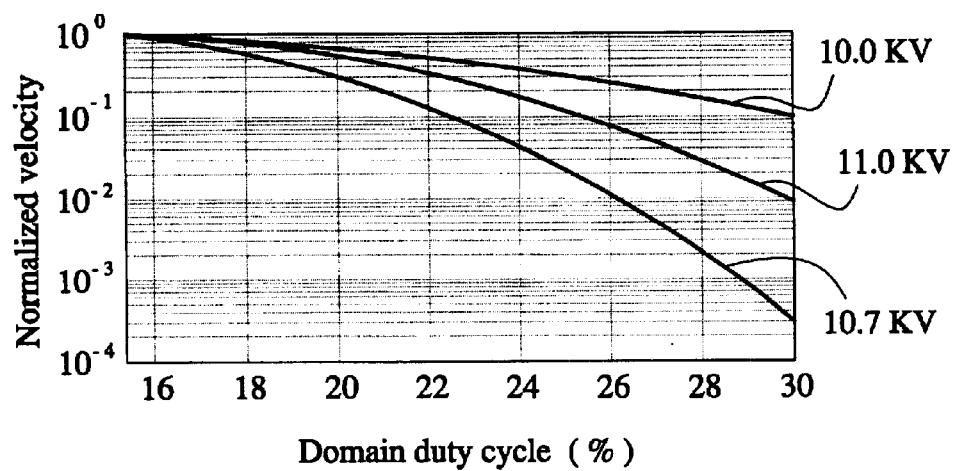
FIG. 6 Depicts a graph of normalized domain wall velocity versus time for three different choices of electrode voltage.

To identify the optimum poling voltage, the fractional change in domain wall velocity from the beginning of poling to the desired domain duty cycle should be used. An example of the effect of poling voltage on the fractional change in domain wall velocity can be seen in FIG. 6. In this example, the sample is 500-$\mu$m thick, has a 6.5-$\mu$m period with 1-82 m-wide electrodes, and is covered with a 0.5-$\mu$m-thick spin-on-glass insulator. With an applied voltage of 10.0 kV, domain-wall velocity decreases by a factor of 11 as the domain duty cycle increases from 15% to 30%. With an applied voltage of 11.0 kV, domain-wall velocity decreases by a factor of 110. The optimum poling voltage, 10.7 kV results in a 3000-fold reduction in domain wall velocity. At 10.7 kV, the internal field is initially 21.4 kV/mm and decreases to 20.6 kV/mm as the domain grows. The large change in domain wall velocity is due to the high velocity-field contrast at 20.75 kV/mm. When using the optimum poling voltage, domain motion slows dramatically as it approaches the design-target duty cycle, providing a wide tolerance on the duration of the poling pulse.

Figure 7:
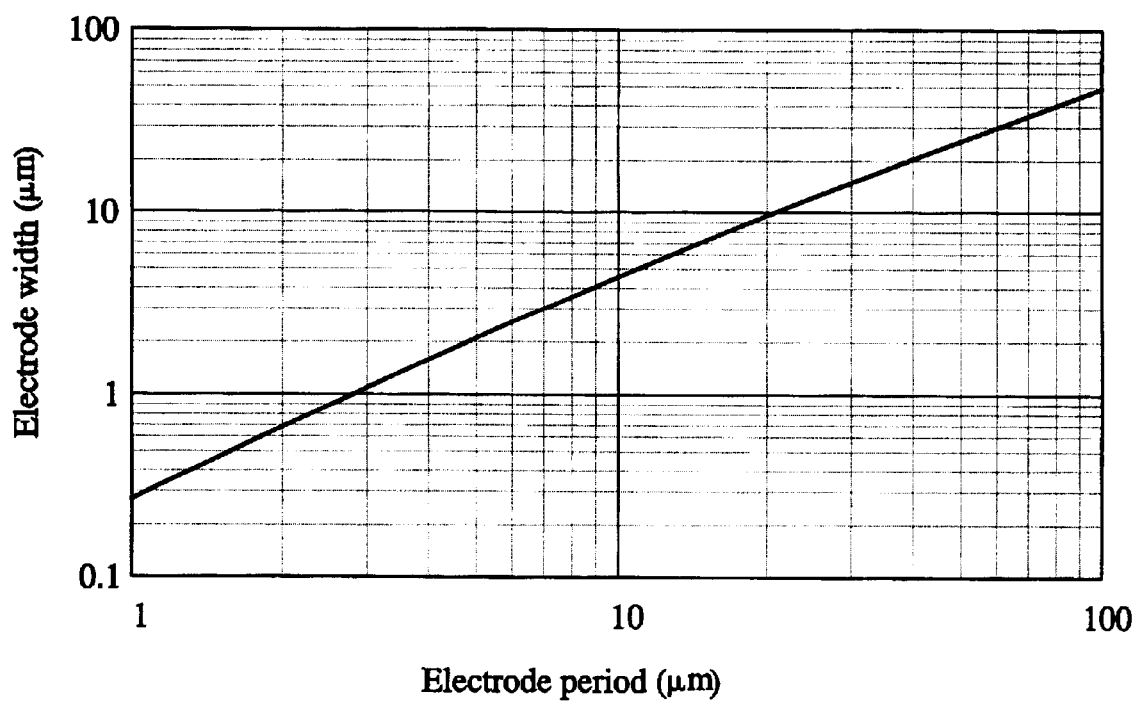
FIG. 7 depicts a graph of electrode width versus electrode period calculated according to an embodiment of the method of the present invention.

The predictive power of the model facilitates the design of electrode and insulator configurations. An important parameter is the electrode width needed to create a 50% domain duty cycle. The computational part of the model provides a means for simultaneously optimizing both the initial poling voltage and the electrode width in order to achieve a specified domain duty cycle. FIG. 7 shows the results of such a calculation, where a 0.5-$\mu$m-thick spin-on-glass insulator covers the periodic electrodes and sample surface.

The above model teaches that the insulator used to cover the electrodes and the spaces between them, the interface between the insulator and the LiNbO$_3$ surface, and the near-surface region of the LiNbO$_3$, preferably have low conductivity and high dielectric strength. Conductivity between the electrodes can contribute significantly to the loss of domain pattern quality as domain period is reduced and substrate thickness is increased. Conductivity can be reduced, for example, by annealing the surface of a LiNbO$_3$ substrate in oxygen at a temperature greater than about 150° C. Spin-on-glass materials generally provide adequate dielectric strength and low conductivity.

The model also teaches that domain nucleation site density must increase with the inverse-square of the domain period and have a value on the order of one domain per period-squared in order to maintain domain pattern quality. Experiments show that the choice of electrode material has a large effect on nucleation site density. For example, sputtered nichrome typically produces enough nuclei per unit area to permit fabrication of visible light devices.

Previously, excessive domain merging during poling limited the maximum length of PPLN devices with this period to 6 mm. Embodiments of the present method forward pole the substrate in the conventional fashion using liquid electrolyte for electrical contact with the patterned electrodes and unpatterned surface, and a high voltage source to provide the external field necessary to nucleate and grow domains. During the forward poling stage poling is allowed to continue through to completion, i.e., when the domains spread beneath the insulator and generally merge in bulk. Once forward poling has been completed the external field is removed before the depolarization field has been screened by bulk and external charges. The depolarization field switches sign due to the process of forward domain inversion. The depolarization field is, therefore, momentarily large enough to cause the erasure, or backswitching, of the forward switched domains. Depending on the speed of the screening process, backswitching can continue until the domains have returned to their original state. In embodiments of the present method, however, backswitching can be terminated by re-applying the external field. The ability to selectively enable and terminate backswitching allows for the formation of domain patterns with small feature sizes and high uniformity through large volumes of material.

Figure 8A:
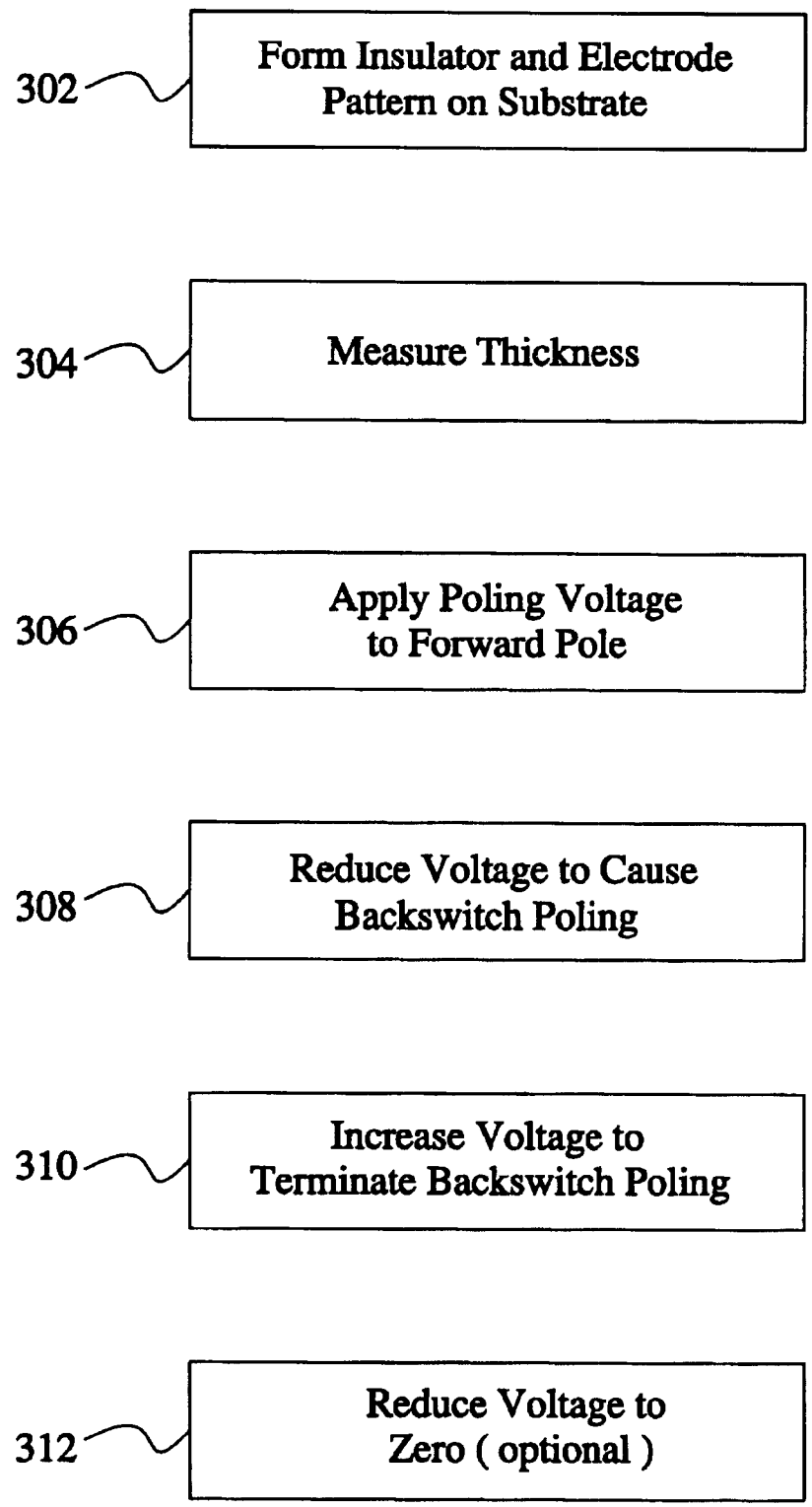
FIG. 8a depicts a flow diagram of an embodiment of the poling method of the present invention.
Figure 8B:
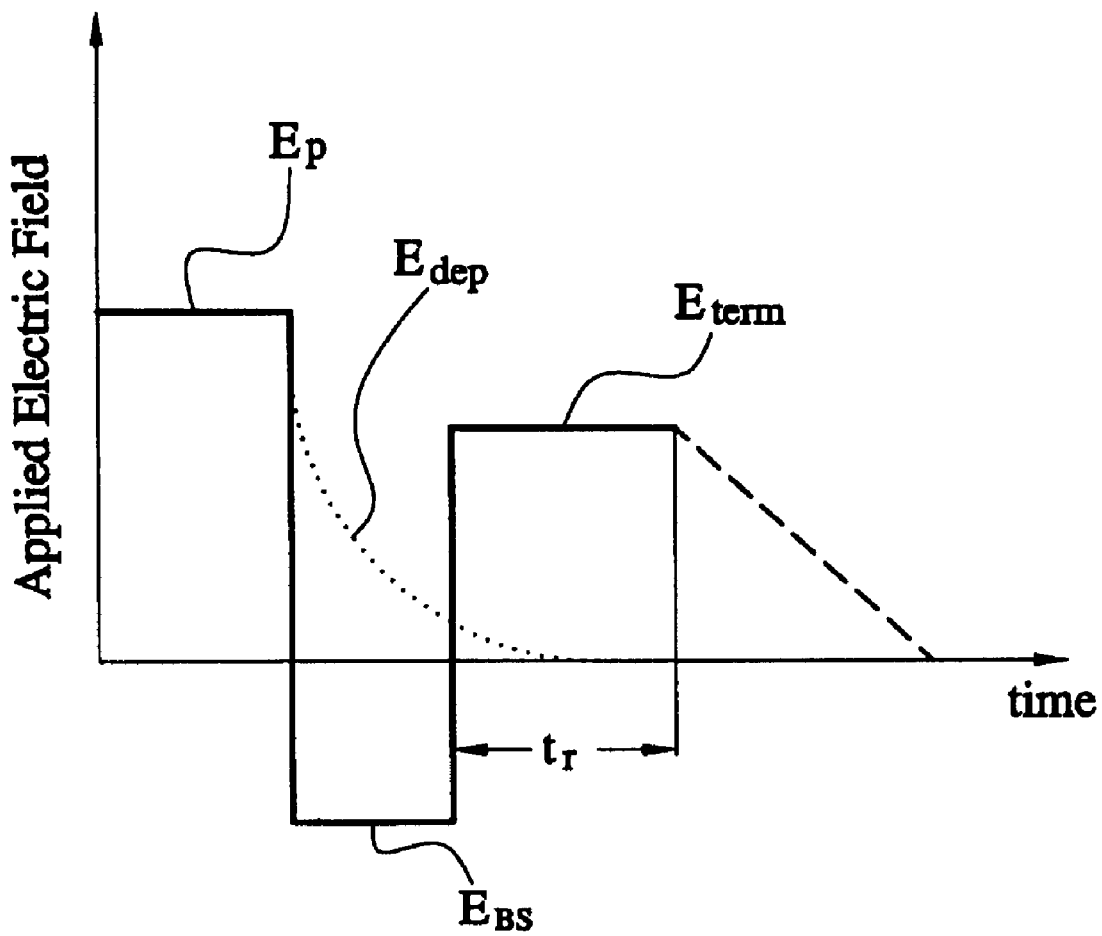
FIG. 8b depicts a poling waveform according to an embodiment of the poling method of the present invention.

An exemplary embodiment of the method of the present invention is depicted in the flow diagram of FIG. 8*a* and the corresponding graph of FIG. 8*b*. The processing steps of method 300 are described with respect to obtaining a domain period of about 4 microns over an entire PPLN wafer 0.5-mm-thick and 3-inches in diameter. The PPLN sample for a practical device may have a length of up to about 75 millimeters. The recitation of a specific domain period and wafer dimensions this example should not be construed in any way as limiting the scope of the invention.

First, in step 302, an insulator and electrode pattern is formed on a ferroelectric substrate. For example the +z face of an optical grade z-cut lithium niobate wafer may be lithographically patterned with a periodic array of sputtered nichrome stripes with the grating k vector parallel to the crystallographic x axis. Suitable wafers, made by Crystal Technology, Inc., can have a 500-$\mu$m nominal thickness and a 76.2-mm diameter (3-inch). For the purposes of the present invention, Nichrome may comprise any proportion of Nickel and Chromium from 100% Nickel to 100% Chromium. In an exemplary embodiment the nichrome composition is 80% Ni and 20% Cr. Nichrome typically provides the greatest nucleation site density (NSD) of any of the electrode materials tested. The +z face is usually chosen because nichrome exhibited higher NSD on the +z face than the −z face. Nichrome's NSD was approximately one nucleus per period-squared for the 4-$\mu$m period used here. A typical electrode pattern uses nichrome stripes 50 nm thick, 0.5 $\mu$m wide, 60 mm long, with a period of 4 $\mu$m.

Figure 9:
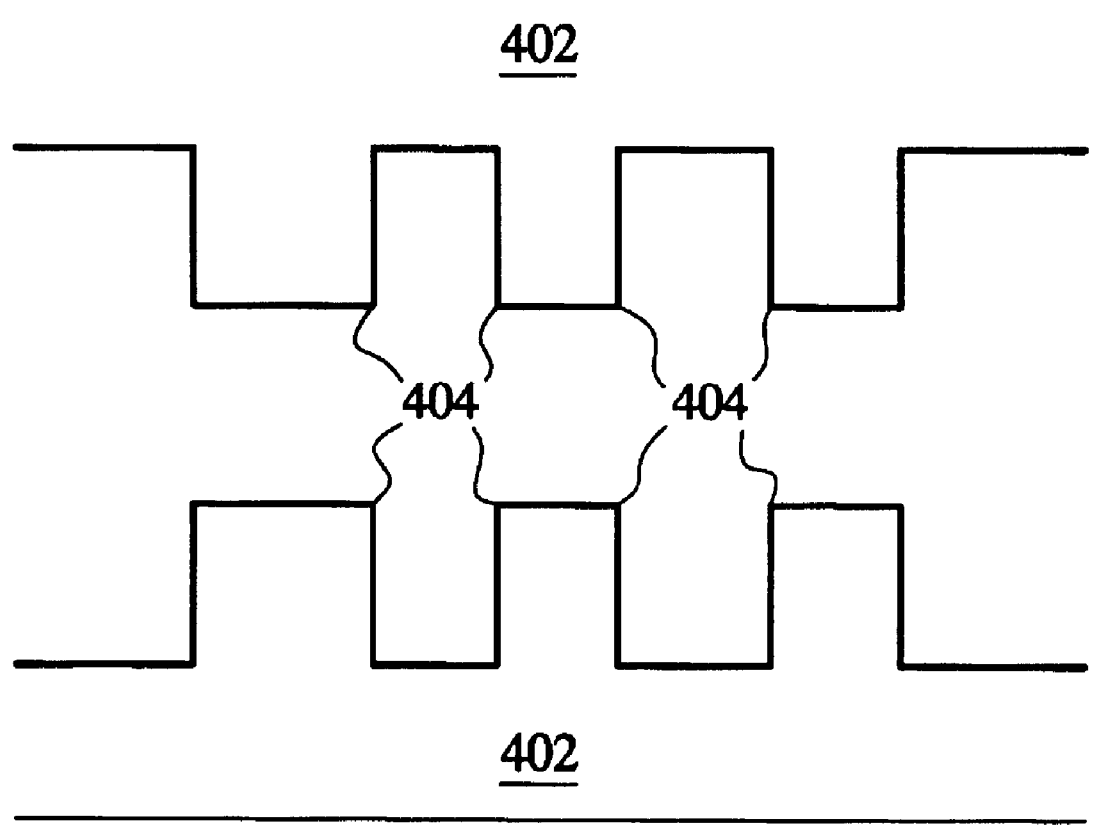
FIG. 9 depicts a plan view of an electrode structure for periodic poling in accordance with the method of the present invention.

FIG. 9 depicts a plan view of an electrode structure for periodic poling in accordance with the method of the present invention. An electrode 402 is disposed on a surface of a substrate 404. The electrode structure may be a single electrode 402 applied to a single surface of substrate 404, Alternatively a plurality of electrodes may be applied to a plurality of surfaces of substrate 404, e.g. an array of electrodes applied to two opposing surfaces of the substrate. Electrode 402 includes multiple tips 404. To enhance spontaneous backswitching it is desirable to increase the density of electrode tips 404 in the electrode 402. The electrode tips produce more fringe field in the substrate, which has been found to enhance the poling process.

To provide high resistivity, the metallized +z face can be overcoated with a 0.5-$\mu$m-thick spin-on-glass (Allied Signal) insulator cured at 350° C. in air for 8 h. Spin-on-glass has a higher resistivity than photoresists baked in the usual manner, and higher dielectric strength than super-baked (180° C. ) photoresists. Alternatively, the substrate may be coated with an oxide or an oil, such as a silicone oil, to increase the surface resistance. Those skilled in the art will be able to devise other means of increasing the resistivity of the material between the electrodes. An annular electrolyte-contact window, 55 mm in diameter and 2-mm wide, can be opened in the insulator with hydrofluoric acid and a photoresist mask. Additional contact windows may be added to compensate for discontinuous metal stripes caused by defects in lithography.

Next, in step 304 the thickness of the wafer is measured to determine the voltage required for the desired poling field $E_p$, which is greater than a critical field $E_c$ required for domain reversal. The wafer is then loaded into an electrolyte-contacting fixture of a known type. The electrolyte used is typically a saturated solution of lithium chloride in water. The electrolyte uniformly contacts the –z face. On the +z face, the electrolyte uniformly contacts the insulator and the metal stripes were contacted via the electrolyte contact windows.

The assembled fixture is connected to a voltage source and a forward poling voltage is applied to the wafer at step 306 to apply field $E_p$ to the wafer to forward switch the domains. The voltage is applied for a period of time long enough to allow forward switching to continue through to completion. Alternatively, forward switching may proceed until a duty-cycle of the domains exceeds 50%. One suitable source is a Trek Model 20/20 high voltage amplifier driven by a SRS DS345 arbitrary waveform generator. The Trek is a voltage-regulated high-voltage amplifier with a nominal current limit of 20 μA. The voltage across the contact fixture can be recorded using the Trek's voltage monitor output and a LeCroy 9304M oscilloscope. The current through the wafer can be monitored using a 1-kΩ series resistor to ground. The applied voltage establishes an electric field having a magnitude greater than that required for domain reversal. For example, the SRS can be programmed to apply 21.5 kV/mm to the wafer to maximize domain NSD. When the poling current rises to the Trek's current limit, the applied field falls to about 20.9 kV/mm.

At step 308 the voltage is lowered such that the electric field within the wafer is below the value of the internal depolarization field $E_{dep}$ to cause backswitch poling of the domains forward switched in step 306. Typically, the voltage source is simply turned off. Alternatively, a negative, i.e., reverse polarity, voltage may be applied to the electrodes. Furthermore, the voltage may be reduced such that the field remains below the value of the internal depolarization field as the internal field decays due to dislocations in the crystal lattice, as shown by the dotted line in FIG. 8b. The reduced voltage (and field) is maintained at step 308 until the backswitching process has led to sufficient domain reversal to produce a periodically poled structure of the desired period and/or duty-cycle. For example, by appropriate control of the time t for which the reduced voltage is maintained, so that the duty-cycle of the domains may be reduced to approximately 50%. The domain reversal process is stopped at step 310 by increasing the poling voltage sufficient to induce an electric field having a magnitude $E_{term}$ greater than a value $E_{BS}$ at which backswitching occurs in the substrate material. Preferably, the value of the electric field $E_{term}$ is large enough to terminate domain motion, but not so large as to induce forward poling. The voltage is maintained at step 310 until the current drops substantially, e.g. by about a factor of two or more. The field $E_{term}$ is typically maintained for a time $t_r$, which is greater than a relaxation time of the substrate material.

The voltage may then be optionally reduced to zero at step 312. For example, the voltage may be ramped to 0 kV/mm over 60 ms to prevent backswitching as shown by the dashed line in FIG. 8b. If the field is ramped down at step 312, it is desirable to reduce electric field at a rate slower than a rate of relaxation of domains within the substrate.

EXPERIMENTAL RESULTS

Figures 10A, 10B:
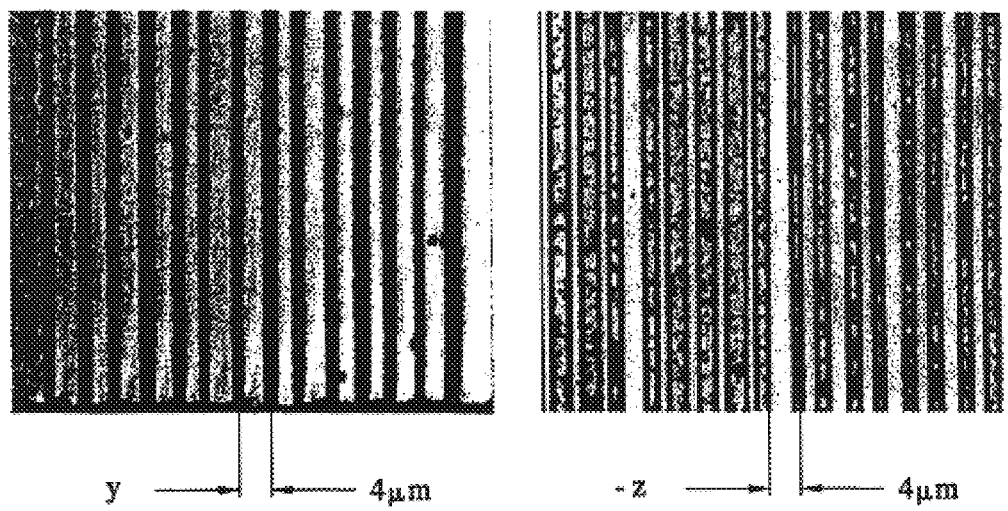
FIG. 10a depicts an etched y face through a 0.5-mm-thick sample of lithium niobate poled in accordance with an embodiment of the present invention.
FIG. 10b depicts an etched y face through a 0.5-mm-thick sample of lithium niobate poled in accordance with an embodiment of the present invention.

PPLN samples with a 4-μm-domain period were successfully fabricated on 3-inch diameter, 0.5-mm-thick lithium niobate wafers using the electric field periodic poling method described above with respect to FIGS. 8a and 8b. Electrodes 0.5-micron wide NiCr electrodes with a 4-micron period were patterned on the +z face of wafers. The wafers were forward poled for 145 ms and then allowed to backswitch for 39.2 ms. The wafers were then etched in hydrofluoric acid to reveal the domain structures. FIGS. 10a and 10b respectively show y face and –z face views of the domains. PPLN samples up to 50 mm in length having 4-micron poling periods were taken from the backswitched wafers.

Figure 11:
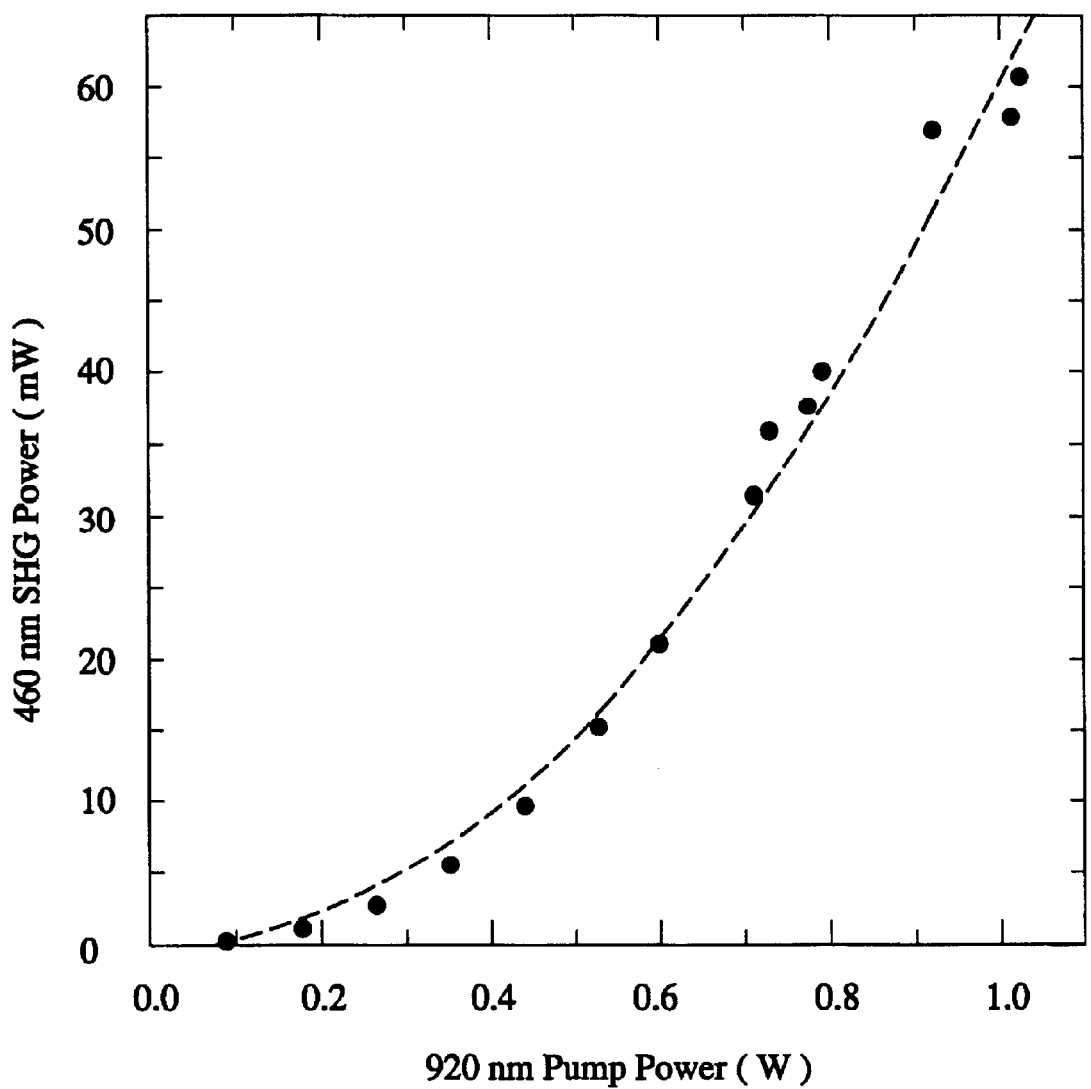
FIG. 11 shows a temperature tuning curve for a periodically poled sample fabricated in accordance with an embodiment of the present invention.
Figure 12:
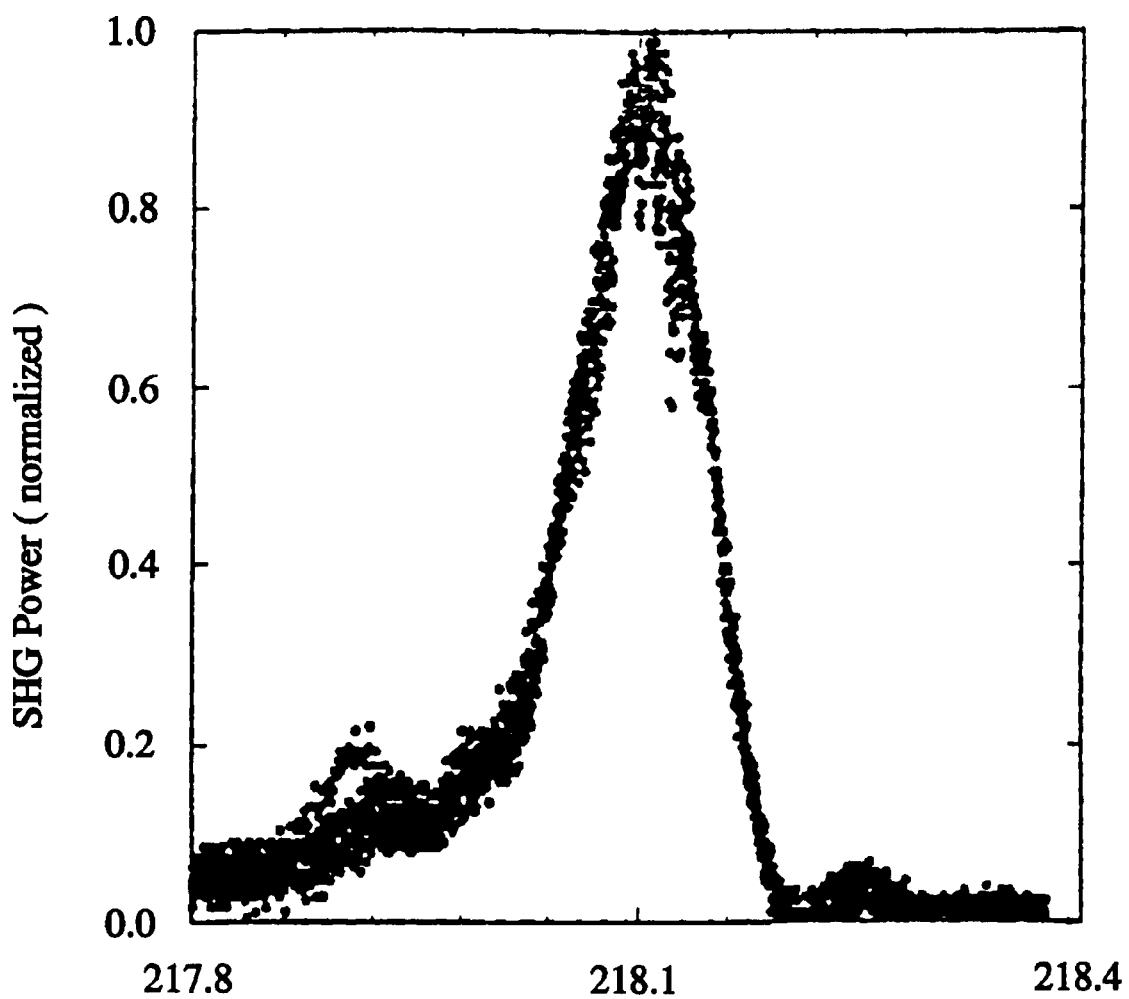
FIG. 12 shows 460-nm output power versus 920-nm input power for a periodically poled sample fabricated according to an embodiment of the present invention.

The backswitched 0.5-mm-thick PPLN samples were characterized for nonlinear conversion efficiency by single pass frequency doubling of a 1 W continuous wave (CW) Ti:SAF pump laser operating at 920 nm. An uncoated 50-mm long sample was heated to about 220° C. and the pump beam was near-confocally focused to a 44-micron waist radius in the center of the crystal. FIG. 11 shows a temperature tuning curve for a typical sample. FIG. 12 shows a graph of 460-nm output power as a function of 920-nm pump power. With 766 mW of pump power internal to the PPLN, 38 mW of 460 nm light was generated internally. This corresponds to a 4.9% conversion of the pump radiation, or 6.4% per watt conversion efficiency. Additional experimental results with 1 Watt of CW pump power internal to the PPLN crystal generated over 60 mW of SHG output power at 460 nm. Furthermore, single pass mode-locked SHG experimental results for 12-mm-length, 4-μm-period samples include generation of approximately 0.5 W output power at 463 nm with 59% conversion efficiency.

Variations on the poling method described above have successfully produced periodically poled structures with poling periods as low as 1.75 nm. The various embodiments of the present invention may readily be modified to provide periodically poled structures having poling periods as low as 10–100 nm.

Periodically poled structures fabricated in accordance with the present invention may be used in any type of frequency conversion device. Such devices find application in apparatus such as tuneable electromagnetic radiation sources, light sources, optical modulators, beam deflectors, surface acoustic wave generators, lasers, optical parametric oscillators, second harmonic generators, sum-frequency generators, and difference frequency generators. Such apparatus typically pump a periodically poled structure with a source of radiation at one or more pump frequencies and provide an output at one or more output frequencies.

Figure 13A:
FIGS. 13a–13d depict spatial frequency multiplication of domain structures by backswitch poling.
Figure 13C:
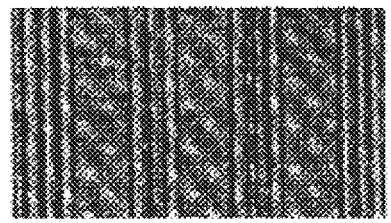
Figure 13B:
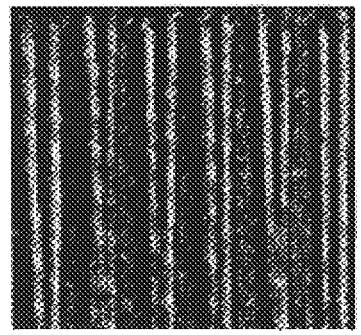
Figure 13D:
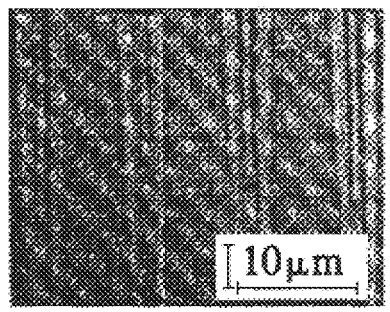

Backwsitch poling in $LiNBO_3$ enables higher fidelity and shorter period domain patterning of thick substrates that can be achieved with conventional poling. Additional experiments using embodiments of the method of the present invention have demonstrated the formation of backswitched periodic domains at the edges of the electrodes, thereby enabling the formation of domain periods at multiples of the spatial frequency of the electrode structure. LiNBO$_3$ wafers were patterned with 10-$\mu$m-period and 2-$\mu$m-width stripe electrodes and poled over 56-mm-diameter circular regions. These samples were forward poled until the duty cycles of the domains reached approximately 50%; they then suffered electrical breakdown near the o-rings of the poling fixture. The breakdown occurred before the stabilization voltage was applied to stop the backswitching. The domains were therefore allowed to spontaneously backswitch. FIG. 13(a) is a Z+surface image taken from one of these wafers, which demonstrates the possibility of spatial frequency doubling of 10-$\mu$m-period domains. FIG. 13b shows a y surface view of the surface shown in FIG. 13a, the domain depth is typically 50–100 $\mu$m for 1 $\mu$m domain widths. FIG. 13c shows another portion of the same wafer, with spatial frequency tripling of the 10-$\mu$m-period electrode pattern on the z+surface. In this case, the additional submicron-wide domains penetrate 20–50 $\mu$m deep as shown in FIG. 13d.

Figure 14A:
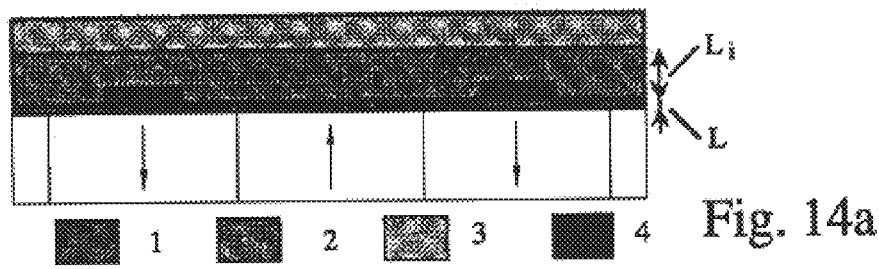
FIGS. 14a–14d depict the growth of nanodomains during periodic backswitch poling according to an embodiment of the present invention.
Figure 14B:
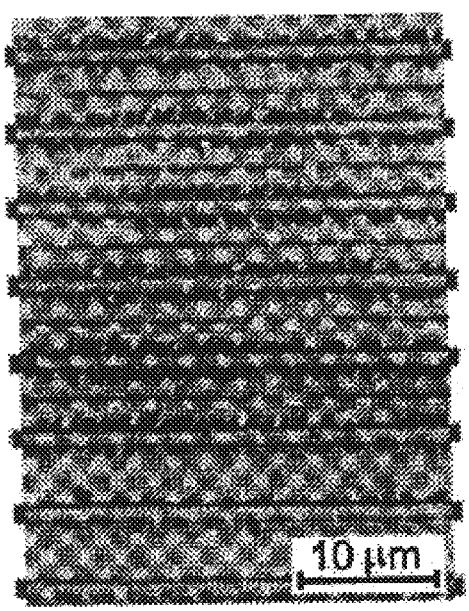
Figure 14C:
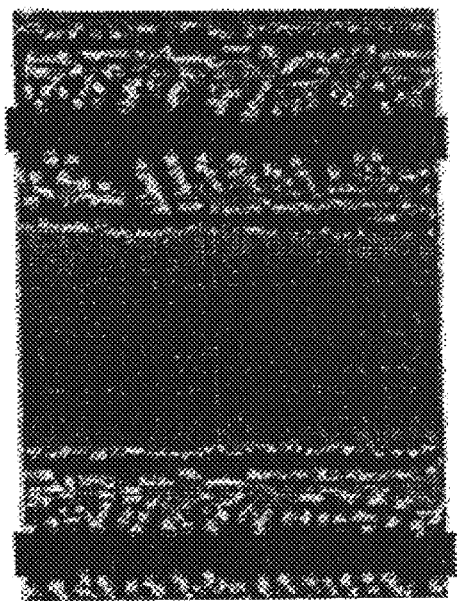

Detailed investigation of the initial stage of spontaneous backswitching with scanning electron microscope (SEM) imaging of the domain configuration in the polar plain has revealed the existence of chains of nanodomains. For example, FIG. 14c depicts an SEM image showing nanodomains formed near the edge of an electrode during backswitching. These domains typically have diameters of between about 50 and 100 nanometers. At a linear density of up to about $10^{-4}$ mm$^{-1}$. Isolated needle-shaped domains of unknown origin have been observed previously in LiNBO$_3$. Such nanodomains may be used to produce periodically poled structures.

Figure 14D:
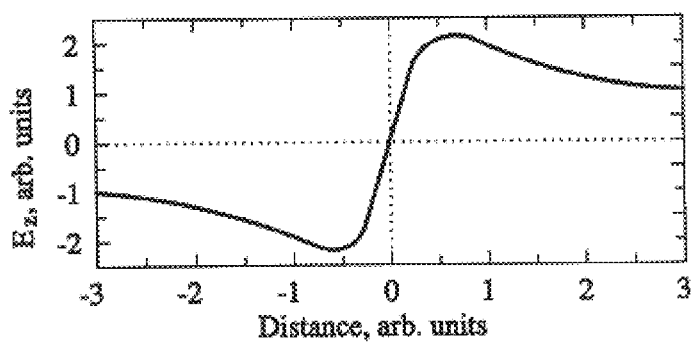

It has been experimentally observed that the displacement in the formation of domain structures with a small period often changes from one electrode to the next, and extraordinarily large boundary displacements are observed in some regions. The anomalous mechanism of domain boundary motion can be analyzed by analogy with the "correlated nucleation" effect observed previously in lead germanate. The effect is believed to be attributable to the long range influence of a moving domain boundary. FIGS. 14a–14d depict this effect. FIG. 14a is a schematic diagram of the surface zone of the wafer with dielectric gap 1, insulator layer 2, liquid electrolyte 3, and metal electrodes 4. FIG. 14b shows an optical micrograph depicting domain configurations with anomalous broadening of the domains beyond the limits of the electrodes 4. FIG. 14c is a close-up scanning electron micrograph showing the formation of nanodomains. A calculation of polar component of the local electric field near a planar domain boundary, as shown in FIG. 14d reveals a pronounced maximum at a distance of order of the thickness of the surface dielectric gap. In LiNBO$_3$ this distribution results in the formation of strings of wedge nanodomains in the surface layer and their subsequent growth in preferred directions.

It will be clear to one skilled in the art that the above embodiment may be altered in many ways without departing from the scope of the invention. For example, materials other than LiNbO$_3$, such as LiTaO$_3$, KTiOPO$_4$ and its isomorphs, and MgO:LiNbO$_3$ may be used. Accordingly, the scope of the invention should be determined by the following claims and their legal equivalents.

What is claimed is:

1. A method for fabricating a periodically poled structure, the method comprising:
   a) providing a ferroelectric substrate with a periodic electrode structure on a surface of the substrate;
   b) applying a poling voltage to the electrode structure to produce an electric field within the substrate, wherein the voltage induces a field substantially greater than a field required to cause domain reversal within the substrate;
   c) reducing the poling voltage so that the induced electric field has a value that is less than a value of an internal field within the substrate to induce spontaneous backswitching of the domains;
   d) increasing the poling voltage to terminate the backswitching wherein domain motion terminates.

2. The method of claim 1 wherein an amount of time between reducing the poling voltage and reapplying the poling voltage determines a poling period of the substrate.

3. The method of claim 1 wherein the ferroelectric material is chosen from the group consisting of LiNbO$_3$, LiTaO$_3$, KTiOPO$_4$ and its isomorphs, and MgO:LiNbO$_3$.

4. The method of claim 1 further comprising
   e) lowering the voltage to zero.

5. The method of claim 4 wherein the voltage is lowered in e) at a rate slower than a rate of relaxation of domains within the substrate.

6. The method of claim 1 wherein the electric field in
   d) has a magnitude such that domain motion terminates.

7. The method of claim 1 wherein the electric field in b) is maintained for a time t, such that a duty-cycle of the domains grows to 50% or greater.

8. The method of claim 1 wherein the electric field in
   c) is maintained for a time t, such that a duty-cycle of the domains is approximately 50%.

9. The method of claim 1 wherein steps a)-d) produce a domain structure in the substrate, the domain structure having a poling period of between about 0.001 microns and 10 microns.

10. The method of claim 1 wherein the electrode structure includes a plurality of electrode tips that enhance formation of domains.

11. The method of claim 1 further comprising increasing an electrical resistance of a surface of the substrate.

12. The method of claim 11 wherein the electrical resistance is increased by applying a dielectric insulator to the surface.

13. The method of claim 12 wherein the dielectric insulator is chosen from the group consisting of photoresists, oxides spin-on-glasses and oils.

14. The method of claim 1 wherein the electrode structure includes a plurality of electrodes applied to a plurality of surfaces of the substrate.

15. A periodically poled structure manufactured in accordance with the method of claim 1.

* * * * *

UNITED STATES PATENT AND TRADEMARK OFFICE
CERTIFICATE OF CORRECTION

| | | |
|---|---|---|
| PATENT NO. | : 6,542,285 B1 | Page 1 of 1 |
| APPLICATION NO. | : 09/493647 | |
| DATED | : April 1, 2003 | |
| INVENTOR(S) | : Batchko et al. | |

It is certified that error appears in the above-identified patent and that said Letters Patent is hereby corrected as shown below:

Under Column 1:

• Please replace Column 1, line no. 13-18 with:

-- FEDERALLY-SPONSORED RESEARCH OR DEVELOPMENT
This invention was made with Government support under contract N00014-92-J-1903 awarded by the Department of the Navy ONR. The Government has certain rights in this invention. --

Signed and Sealed this
Thirteenth Day of March, 2012

David J. Kappos
*Director of the United States Patent and Trademark Office*